United States Patent
Gestermann et al.

[11] Patent Number: 6,039,853
[45] Date of Patent: Mar. 21, 2000

[54] ELECTROCHEMICAL HALF-CELL

[75] Inventors: Fritz Gestermann, Leverkusen; Hans-Dieter Pinter, Wermelskirchen; Karl-Ludwig Metzger, Bergisch Gladbach; Heiko Herold, Neuss, all of Germany

[73] Assignee: Bayer Aktiengesellschaft, Leverkusen, Germany

[21] Appl. No.: 09/057,227

[22] Filed: Apr. 8, 1998

[30] Foreign Application Priority Data

Apr. 14, 1997 [DE] Germany ................ 197 15 429

[51] Int. Cl.[7] ............................................ C25B 9/00
[52] U.S. Cl. .................... 204/258; 204/253; 204/257; 204/265; 204/266; 204/277; 204/278; 204/283
[58] Field of Search ................... 204/265, 266, 204/277, 278, 263, 275, 283, 253, 257, 258

[56] References Cited

U.S. PATENT DOCUMENTS

| | | | |
|---|---|---|---|
| 4,445,986 | 5/1984 | McIntyre et al. | 204/265 |
| 4,534,845 | 8/1985 | McIntyre et al. | 204/265 |
| 4,657,651 | 4/1987 | Wainerdi | 204/265 |
| 5,104,497 | 4/1992 | Tetzlaff et al. | 204/59 |
| 5,395,501 | 3/1995 | Rohrbacher et al. | 204/265 |
| 5,693,202 | 12/1997 | Gestermann et al. | 204/265 |

FOREIGN PATENT DOCUMENTS

| | | |
|---|---|---|
| 0150017 | 7/1985 | European Pat. Off. . |
| 0717130A1 | 6/1996 | European Pat. Off. . |

*Primary Examiner*—Bruce F. Bell
*Attorney, Agent, or Firm*—Sprung Kramer Schaefer & Briscoe

[57] ABSTRACT

The invention relates to an electrochemical half-cell (1) with a gas diffusion electrode (7) as cathode or anode wherein the gas chamber (6) is divided in particular into two or more gas pockets (6a, 6b, 6c) arranged one above another, the electrode chamber (2) of the half-cell (1) being divided into compartments (2a, 2b, 2c) which for the passage of the electrolyte (23), are connected to one another in cascade fashion via chutes (17), (18), (19).

8 Claims, 4 Drawing Sheets

ELECTROCHEMICAL HALF-CELL

The invention relates to an electrochemical half-cell with a gas diffusion electrode as cathode or anode wherein the electrode chamber of the half-cell is divided into optionally upwardly traversed compartments which, for the passage of the electrolyte, are connected to one another in cascade fashion via chutes and wherein the gas chamber is divided in particular into two or more gas pockets arranged one above another.

BACKGROUND OF THE INVENTION

The operation of electrochemical cells based on gas diffusion electrodes, for example for use as oxygen-consuming cathode in alkali halogenide electrolysis, is basically known and described for example in U.S. Pat. No. 4,657,651.

A gas diffusion electrode is an open-pored structure between electrolyte and gas chamber which has an electrically conductive coating with a catalyst and which is to allow an electrochemical reaction, for example the reduction of oxygen, to take place at the three-phase boundary of electrolyte catalyst and reactant gas in the electrode structure. The boundary layer is generally held in the structure by the surface tension of the electrolyte on the hydrophobic electrode material against the hydrostatic pressure of the electrolyte on the electrode structure. However, only a small pressure drop is permitted between the gas side and the liquid side of the structure which acts as a diaphragm. If the gas-side pressure is too high, the gas finally breaks through the diaphragm, the electrode is disturbed in its function in this region and the electrolytic process is interrupted. If on the other hand the liquid pressure is too high, the three-phase boundary is displaced from the region of the diaphragm containing the catalyst which likewise disturbs the function of the cathode and in the event of a further increase in pressure leads to a liquid breakthrough of electrolyte into the gas chamber. In the case of a vertical electrode arrangement, as required for example in diaphragm electrolysis to permit a favourable discharge of the target product chlorine, this leads to a limitation of the overall height of the gas diffusion electrodes as otherwise at the top gas penetrates into the cathode chamber of the electrode and at the bottom electrolytic liquid penetrates into the gas chamber. The technologically attainable overall height therefore remains limited to approximately 20–30 cm, which is unattractive for commercial diaphragm electrolyzers.

To overcome the problem of pressure compensation, various arrangements have been proposed in the prior art.

In accordance with U.S. Pat. No. 4,657,651, a pressure compensation between the gas chamber and the electrolyte chamber on both sides of a gas diffusion cathode is achieved in that the cathode is divided into individual horizontal chambers which are individually supplied with gas, the gas pressure being regulated by in each case plunging the outgoing gas flow through vertical chambers, in that the depth of said vertical chambers corresponds to the level of the electrolyte in the respective chamber. A disadvantage consists in the high outlay in terms of apparatus, which impedes commercial realization. The pressure in each individual gas chamber must in fact be separately adjusted via respective valves.

German Patent DE 4 444 114 C2 describes an electrochemical half-cell with a gas diffusion electrode wherein pressure compensation between the gas chamber and the electrolyte chamber on both sides of a gas diffusion electrode is achieved in that the gas chamber is divided into two or more gas pockets disposed in cascade fashion one above another, said gas pockets being separated from one another and being open at the bottom towards the electrolyte so that via the opening to the electrolyte the pressure in each gas pocket is in equilibrium with the pressure of the liquid column of electrolyte in the corresponding part of the electrode chamber arranged upstream of the gas diffusion electrode, and wherein a possible gas supply and discharge takes place via the openings to the electrolyte.

However, the known electrolytic cell constructions have a series of technical disadvantages.

In particular in the case of electrolytic cells having a relatively large overall height, it is necessary to prevent the hydrostatic pressure on the lower part of the gas diffusion electrode. Another disadvantage of the half-cell construction according to document DE 4 444 144 is that gas bubbles possibly entrained with the electrolyte accumulate in the region of the electrolyte gap upstream of the gas diffusion electrode during the operation of the cell and can disturb the operation of the cell.

It was also necessary to avoid the disadvantage of being unable to regulate the gas pressure independently of the initially defined structural properties of the cell, which exists for example in the case of DE 4 444 144. Rather, the gas pressure should also be able to be adjusted during operation independently of the electrolyte pressure and optionally changed in relation to an electrolyte pressure which is also independent over the height of the cell.

SUMMARY OF THE INVENTION

The object of the invention, which commences from the above described prior art, consists in making available an electrochemical half-cell based on a gas diffusion electrode which permits pressure compensation between the gas side and the electrolyte side of the gas diffusion electrode but which does not possess the above-mentioned disadvantages of the known cell structures. In particular the new cell structure is to facilitate as flat as possible a construction of the half-cell.

This object is achieved, in accordance with the invention, by an electrochemical half-cell based on a gas diffusion electrode as cathode or anode wherein the electrode chamber of the half-cell is divided into compartments which, for the passage of the electrolyte, are connected to one another in cascade fashion via chutes.

The invention relates to an electrochemical half-cell consisting of an electrode chamber for the accommodation of an electrolyte, a gas chamber, and at least one gas diffusion electrode which separates the gas chamber and the electrode chamber and serves as cathode or anode, the gas chamber optionally being divided in particular into two or more gas pockets arranged one above another, characterized in that the electrode chamber is divided into compartments which, for the passage of the electrolyte, are connected to one another in cascade fashion via chutes said electrode chambers each being traversed in particular in the upwards direction.

In particular in the region of the compartment base, the compartments have inlet openings for the electrolyte which provide for a passage of electrolyte through the respective compartment in the upwards direction. Particularly preferably the openings are arranged in the compartment base distributed over the compartment base.

The electrolyte inlet pipe into the electrochemical half-cell is preferably arranged in the uppermost compartment of the half-cell so that the electrolyte flows through the series of interconnected compartments commencing with the uppermost compartment.

The gas chamber of the half-cell is preferably divided into a plurality of gas pockets arranged one above another and corresponding in number in particular to the number of compartments.

The invention further relates to an electrochemical half-cell consisting of an electrode chamber for the accommodation of an electrolyte, a gas chamber, and at least one gas diffusion electrode which separates the gas chamber and the electrode chamber and serves as cathode or anode, the gas chamber being divided into two or more gas pockets arranged one above another, characterized in that for the adjustment of a differential pressure corresponding to the pressure upstream of the gas diffusion electrode the gas pockets are connected to one another via throttling bores and the gas inlet pipe is arranged in the lowest gas pocket.

In a preferred variant, the division of the gas chamber of the electrochemical half-cell into gas pockets is also coupled with the design of the half-cell according to the invention comprising the division of the electrode chamber into compartments.

In the electrochemical half-cell according to the invention comprising compartments disposed above one another in the electrolyte gap and comprising a through-going gas chamber, the compartments are fed consecutively in accordance with the overflow principle and in each case traversed in the upwards direction so that a hydrostatic pressure build-up in the respective compartment remains limited only in accordance with the height of the respective electrolyte column. In the case of the half-cell comprising an electrolyte inlet in the region of the compartment base, the upward flow prevents the suspension of possibly entrained gas bubbles in the electrolyte column. The pressure conditions in the individual stages disposed one above another are fundamentally the same, thus permitting any desired technical structural height without a higher pressure bearing upon the lower part of the gas diffusion electrode than in the upper part. The reaction gas, for example oxygen, can therefore be supplied on the other side of the gas diffusion electrodes inlet into the cascade stages via one single gas chamber which can be divided into individual gas pockets interconnected on the gas side. The differential pressure between gas and electrolyte here is freely selectable. As a result the cathode chamber can be made extremely flat. It is conceivable for example to make the overall thickness of the cell approximately ⅔ of the thickness of the known electrolytic half-cells. An electrolyzer comprising a plurality of diaphragm cells can then be equipped with ⅓ more elements and, taking into account a reduction in operating voltage of ⅓, can be operated at the same overall voltage as a classic diaphragm electrolyzer.

The mode of functioning of the electrochemical half-cell with pressure compensation via gas pockets connected by throttling elements will be described as follows.

In the design comprising a thoroughgoing electrode chamber the reaction gas is fed in through gas pockets arranged in cascade fashion one above another and connected only via throttling elements (for example throttling bores), commencing with the lowest gas pocket, in such manner that the gas pressure which in each case occurs as a result of the throttling and which decreases in the upwards direction corresponds approximately to the corresponding electrolyte pressure upstream of the gas diffusion electrode. Also in this variant the electrolyte flows in the upwards direction to prevent the suspension in the electrode chamber of any gas bubbles fed-in by chance. The reaction gas preliminary pressure corresponds approximately to the pressure at which the electrolyte is fed into the cell at the bottom and is optionally easily adjustable at this location by plunging or by means of an air receiver in each case in association with the electrolyte.

The current supply to the gas diffusion electrode can take place in accordance with basically known arrangements. A current supply arrangement via the mounting device of the gas diffusion electrode is preferred, which again is connected in low-ohmic fashion via the rear side of the electrolytic cell to an external current source, an additional metallic grid structure being applied to the mounting device, which grid structure is connected to the gas diffusion electrode on the gas side or the electrolyte side depending upon the differential pressure between electrolyte side and gas side and provides for short current paths. In the case of a gas diffusion electrode with integrated metallic grid, it is optionally possible to dispense with the separate metallic grid structure on the mounting device if the support of the diffusion electrode in the direction of the gas chamber is ensured by another simple abutment.

The current supply can also preferentially take place via a low-ohmic connection to the rear side of the half-cell.

An advantageous embodiment of the half-cell according to the invention is characterized in that the overall structure of the gas pocket electrode is designed to be removable from the half-cell, for example an electrolytic half-cell.

The half-cell according to the invention can basically be used in all electrochemical processes in which a gas diffusion electrode is operated in direct contact with a liquid electrolyte. Examples of use of the half-cell according to the invention are as follows:

Sodium dichromate electrolysis wherein for example a hydrogen-consuming anode is used; here the hydrogen production in the cathode can be replaced by oxygen reduction in an oxygen-consuming cathode.

Hydrogen peroxide production via oxygen reduction in a gas diffusion cathode.

Application in alkaline fuel cells used for example to enrich soda lye wherein it is possible to use half-cells according to the invention connected as anode for hydrogen conversion and half-cells connected as cathode for oxygen reduction.

Using the half-cell according to the invention it is basically possible for conventional commercially available diaphragm electrolyzers for the electrolysis of alkali halogenide solution to be converted to energy-saving operation for example with oxygen-consuming cathodes.

This also applies in particular to types of cells with a vertical rib structure or to vertical or horizontal inner-structure ribs.

All fundamentally known types of gas diffusion electrodes can be used in the half-cell according to the invention, for example types having integrated metallic support- or current distributor grids or electrodes constructed on carbon tiles or other conductive structures.

In the following the invention will be explained in detail by way of example making reference to the Figures without particularly limiting the invention.

DETAILED DESCRIPTION OF THE PREFERRED EMBODIMENT

EXAMPLES

Example 1

Figure 1:
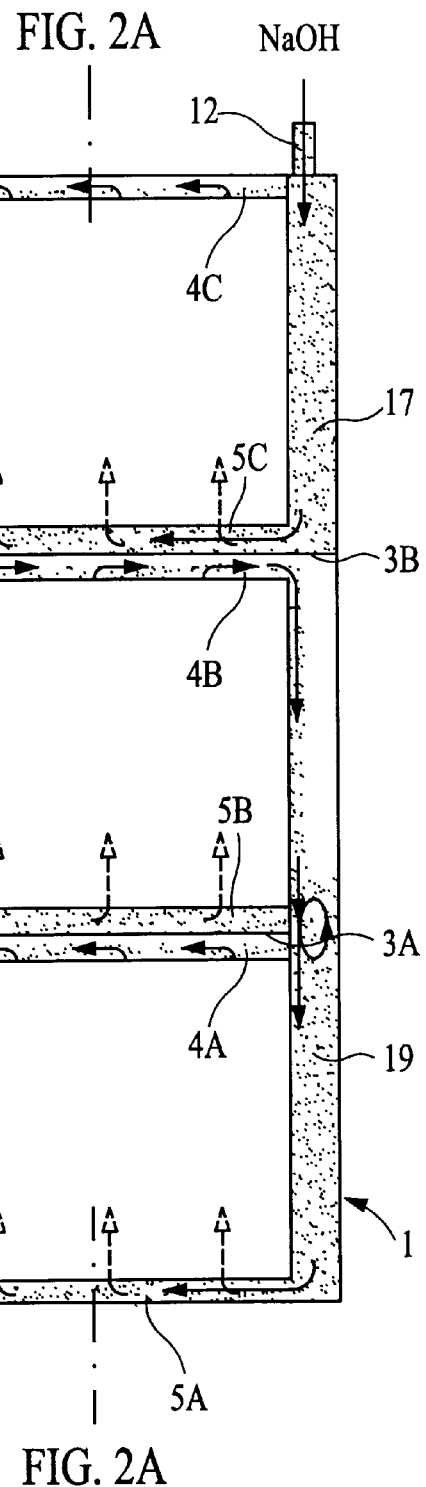
FIG. 1 is a longitudinal section along the line A–A' of FIG. 2a through a half-cell according to the invention in the form of an oxygen-consuming cathode, viewed in the direction of the rear side of the diffusion electrode surface.
Figure 2A:
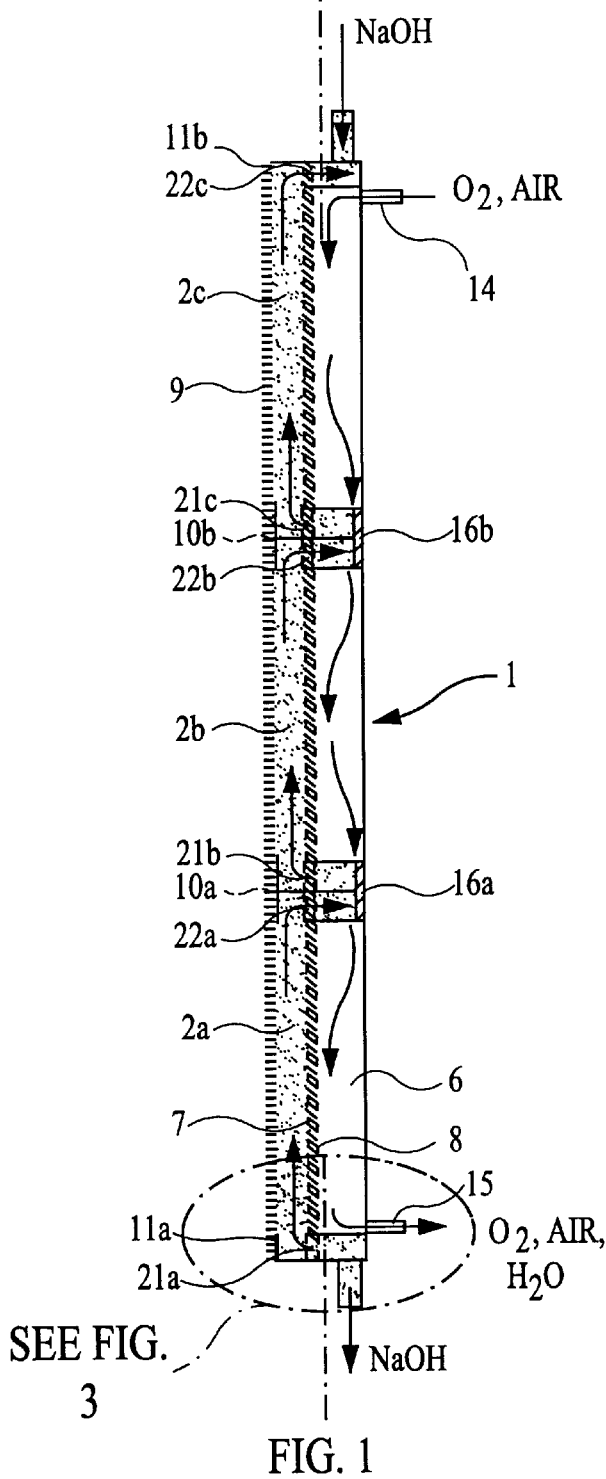
FIG. 2a is a cross-section through the half-cell according to FIG. 1 along the line B–B' of FIG. 1.
Figure 3:
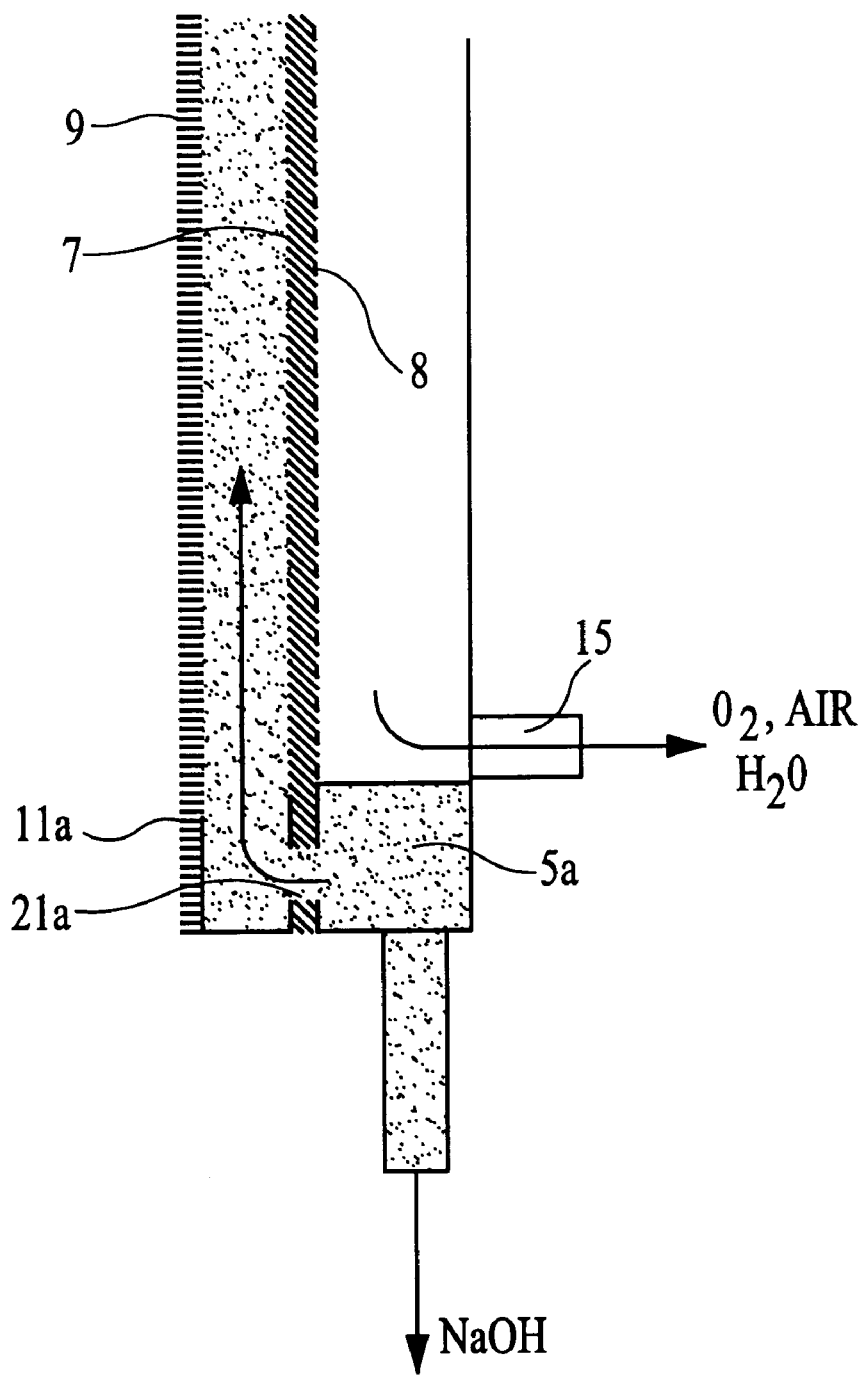
FIG. 3 shows an enlarged detail of a part of the half-cell according to the invention shown in FIG. 1.

An electrochemical half-cell 1 connected as oxygen-consuming cathode is illustrated in FIGS. 1, 2a and 3 and operated as follows:

The electrolyte 23 enters the half-cell 1, in particular the chute 17, through the electrolyte inlet pipe 12. The electrolyte 23 flows on through the horizontal distributor 5c via the bores 21c into the compartment 2c of the electrode chamber 2 and ascends uniformly in the compartment 2c. The electrolyte 23 issues from the compartment 2c through the openings 22c (see FIG. 2a) into the horizontal collector 4c and is discharged in accordance with the overflow principle through the chute 18 connected to the distributor 5b. In the same way the electrolyte 23 in each case flows on through the chutes 19 and 20, the distributors 5a and 5b with the outlet openings 21a and 21b, the compartments 2a and 2b, the outlet openings 22a and 22b and the upper collectors 4a and 4b until finally the electrolyte issues from the half-cell via the chute 20 through the electrolyte outlet pipe 13.

The reaction gas, for example oxygen, enters the gas chamber 6 via the pipe 14. The gas transport channels 16a and 16b provide for a uniform gas supply in the overall gas chamber 6. Excess reaction gas, together with possible condensates, issues from the halt-cell 1 via the gas outlet pipe 15.

The dividing strip 3a and 3b between the collectors and distributors and the support elements 10a and 10b between the segments separate these hydraulically from one another. The support elements 10a and 10b and the edge elements 11a and 11b on the one hand define the gap in the electrode chamber 2 between ion exchanger diaphragm 9 and gas diffusion cathode 7 and press the latter against the collector distributor channels, whereby the gas diffusion cathode 7 is sealed therefrom and at the same time electrically contacted.

Figure 2B:
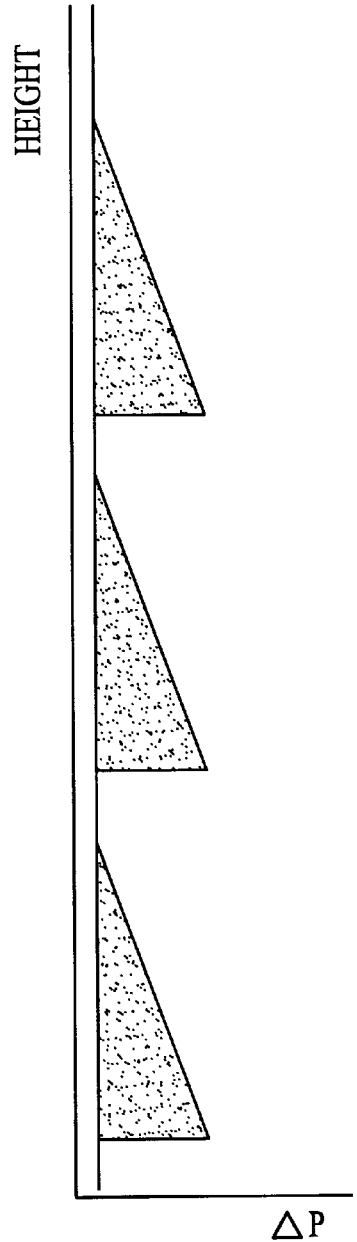
FIG. 2b is a diagram in explanation of the differential pressure on the diffusion electrode.

The sum of the cross-sections of the outlet openings 21a to 21c is smaller in terms of overall area than the cross-section of the distributor channels 5a to 5c in order to ensure a uniform flow of the electrolyte 23 into the compartments 2a to 2c. On the other hand, the outlet openings 22a to 22c into the collectors are to be sufficiently large to prevent the suspension of possibly entrained gas bubbles before these openings. The supply of electrolyte 23 to the half-cell takes place optionally via an inlet pipe at an appropriate geodetical level or by a forced through-flow. In particular in the latter case it is advisable to reduce the number or cross-section of the openings 21c into the upper chamber so as to avoid a harmful pressure build-up on the gas diffusion electrode in the uppermost compartment 2c and in the other cascades. For this reason it can be advantageous to increase the number or cross-section of the openings from compartment to compartment, commencing with the compartment 2c. If gas bubbles have entered the catholyte gap, these firstly coagulate in the upper collector and in the case of a sufficiently high flow speed are entrained downwards through the chute 4c, fed into the next compartment 2b and finally discharged via the last compartment. Alternatively, in the case of concepts employing a low flow speed, each collector 4a to 4c can be provided with a venting means (not shown here) leading into the gas chamber in a corresponding manner. In this case the reaction gas pressure must be adapted to the hydraulic pressure in the region of the collectors while in the case of the dynamic variant the oxygen pressure is freely selectable within the tolerances of the gas diffusion electrode. FIG. 2b shows the distribution of the differential pressures over the individual segments of the half-cell. Here it is essential that, due to the free discharge via the chutes, the absolute pressure is independent of the level of the respective segments.

Example 2

Figure 4:
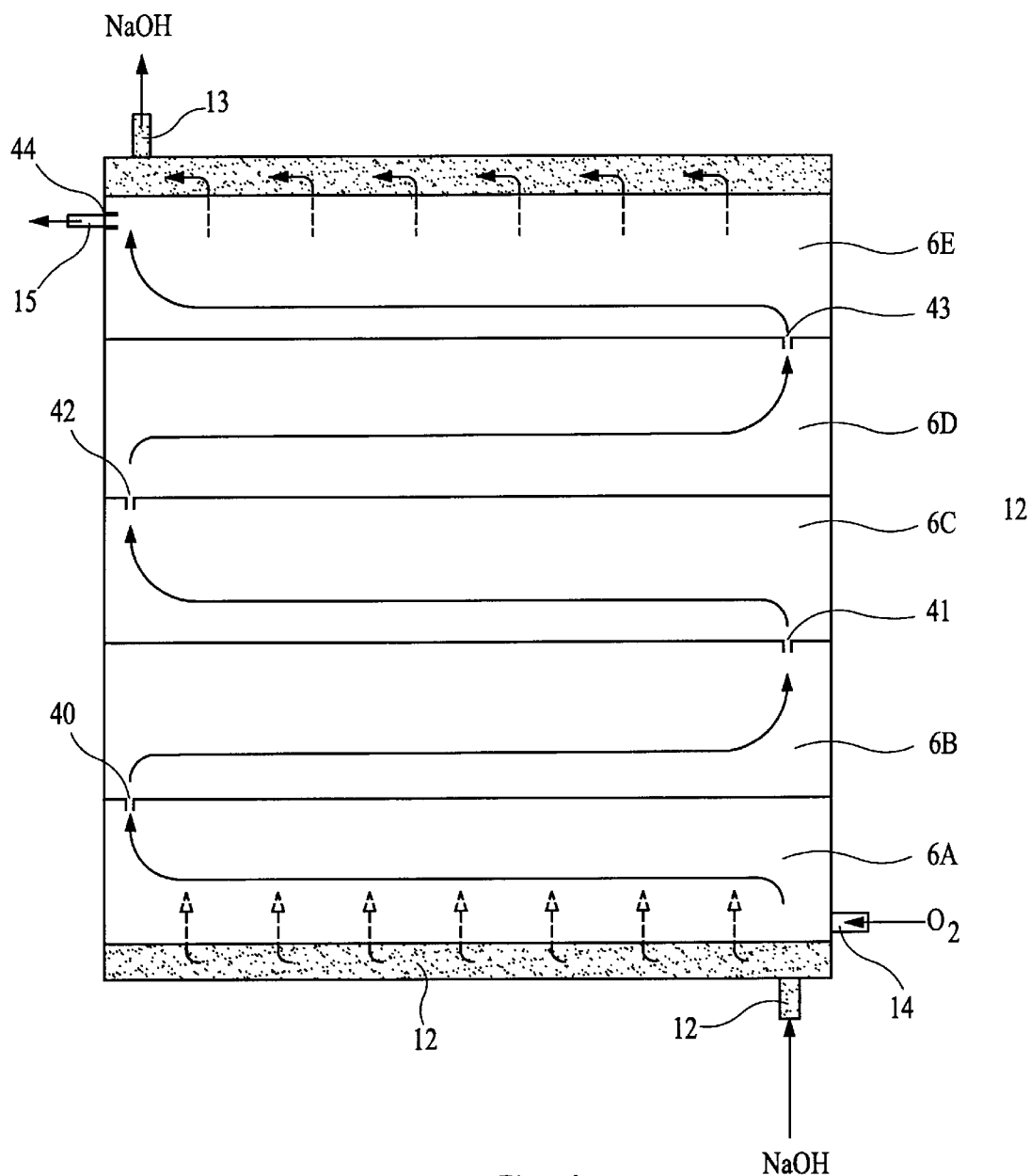
FIG. 4 is a longitudinal section through a variant of the half-cell comprising throttling bores between the gas pockets.

FIG. 4 illustrates the principle of the cascade-like pressure breakdown in the example of a half-cell comprising five gas pockets 6a to 6e arranged one above another. The reaction gas enters the chamber 6a through the pipe 14 at a preliminary pressure of 1560 mm wc (wc=water column) and issues from the chamber 6a through the throttle 40 reduced by the consumed quantity of 0.12 m$^3$/h, then enters the chamber 6b with a 313 mm wc lower pressure and issues from the chamber 6b through the throttle 41 reduced by the consumed quantity of 0.12 m$^3$/h etc. until the excess gas of 0.4 m$^3$/h issues from the chamber 6e through the throttle 44.

In this embodiment of the invention the electrode chamber 2 is through-going and the supply of electrolyte takes place through feed pipes 12 from the bottom in accordance with FIG. 4. The outflow at the top (not shown here) passes through a corresponding collector according to FIG. 4.

In the case of a cell having a height of 1.2 m, a breadth of 0.8 m and 5 segments, for 32% soda lye a 312 mm wc hydrostatic pressure increase occurs in each stage, which pressure increase must be compensated. With a power density of 3 kA/m$^2$, the net consumption of oxygen amounts to 0.6 m$^3$/h, i.e. 0.12 m$^3$/h per segment. With a feed-in quantity of 1 m$^3$/h the upwardly directed throttle bores have the following diameter:

Throttle 44 output gas pocket 6e 2.3 mm
Throttle 43 output gas pocket 6d 2.1 mm
Throttle 42 output gas pocket 6c 1.9 mm
Throttle 41 output gas pocket 6b 1.7 mm
Throttle 40 output gas pocket 6a 1.5 mm The level at which the soda lye is discharged corresponds to the level of the upper edge of the cell.

What is claimed is:

1. An electrochemical half-cell (1) comprising an electrode chamber (2) for the accommodation of an electrolyte (23), a gas chamber (6), and at least one gas diffusion electrode (7) which separates the gas chamber (6) and the electrode chamber (2) and serves as cathode or anode, characterized in that the electrode chamber (2) is divided into compartments (2a, 2b, 2c) which, for the passage of the electrolyte (23), are connected to one another in cascade fashion via chutes (17), (18), (19).

2. An electrochemical half-cell according to claim 1, characterized in that the electrolyte (23) flows upwards in the compartments (2a, 2b, 2c) of the electrode chamber (2).

3. An electrochemical half-cell according to claim 1, characterized in that the compartments (2a, 2b, 2c) have inlet openings (21a, 21b, 21c) for the electrolyte (23), which openings are arranged in the region of the respective compartment base.

4. An electrochemical half-cell according to claim 1, characterized in that the compartments (2a, 2b, 2c) have outlet openings (22a, 22b, 22c) for the electrolyte (23), said openings being arranged in the region of the top of the compartment and their overall area being greater than that of the inlet openings.

5. An electrochemical half-cell according to claim 1, characterized in that the electrolyte inlet pipe (12) into the half-cell is arranged in the uppermost compartment (2c).

6. An electrochemical half-cell according to claim 1, characterized in that the gas chamber (6) is divided into a plurality of gas pockets (6a, 6b, 6c) which are arranged one above another and which correspond in number in particular to the number of the compartments (2a, 2b, 2c), said gas pockets being connected to one another on the gas side without having direct contact with the electrolyte.

7. An electrochemical half-cell according to claim 1, characterized in that the gas pressure in the gas chamber (6), in particular in the gas pockets (6a, 6b, 6c), is adjustable independently of the electrolytic pressure without the pressure compensation being affected.

8. An electrochemical half-cell, in particular according to claim 1, comprising an electrode chamber (2) for the accommodation of an electrolyte (23), a gas chamber (6) and at least one gas diffusion electrode (7) separating the gas chamber (6) and the electrode chamber (2) and serving as cathode or anode, wherein the gas chamber (6) is divided into two or more gas pockets (6a, 6b, 6c) arranged one above another, characterized in that for the adjustment of a differential pressure corresponding to the pressure upstream of the gas diffusion electrode (7) the gas pockets (6a, 6b, 6c) are connected to one another via throttling bores (40, 41, 42) and the gas supply pipe (14) is arranged in the lowest gas pocket (6a).

\* \* \* \* \*